(12) United States Patent
Lin et al.

(10) Patent No.: US 11,533,681 B2
(45) Date of Patent: *Dec. 20, 2022

(54) METHOD FOR ACCESSING ACCESS POINT BY STATION DEVICE, DEVICE, AND SYSTEM

(71) Applicant: Huawei Technologies Co., Ltd., Shenzhen (CN)

(72) Inventors: Yingpei Lin, Shanghai (CN); Jiayin Zhang, Shanghai (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,689

(22) Filed: Oct. 22, 2020

(65) Prior Publication Data

US 2021/0112492 A1    Apr. 15, 2021

Related U.S. Application Data

(63) Continuation of application No. 16/386,415, filed on Apr. 17, 2019, now abandoned, which is a
(Continued)

(51) Int. Cl.
*H04W 48/20* (2009.01)
*H04W 40/24* (2009.01)
(Continued)

(52) U.S. Cl.
CPC .......... *H04W 48/20* (2013.01); *H04B 17/318* (2015.01); *H04L 5/006* (2013.01);
(Continued)

(58) Field of Classification Search
None
See application file for complete search history.

(56) References Cited

U.S. PATENT DOCUMENTS

2004/0039817 A1   2/2004   Lee et al.
2006/0019663 A1   1/2006   Cuffaro et al.
(Continued)

FOREIGN PATENT DOCUMENTS

CN    101741457 A    6/2010
CN    101742518 A    6/2010
(Continued)

OTHER PUBLICATIONS

Kudo, R. et al.: "New Downlink Beamforming Method for Cooperative Multiple Access Point Systems," IEICE Transactions on Communications, Sep. 2007, pp. 2303-2311, vol. E90-B, No. 9.
(Continued)

*Primary Examiner* — Scott M Sciacca
(74) *Attorney, Agent, or Firm* — Slater Matsil, LLP

(57) ABSTRACT

A method for accessing an access point by a station device, a device, and a system. A station device selects a master access point from multiple access points according to channel quality and accesses the master access point, and sends information about remaining access points to the master access point, so that the master access point selects a slave access point according to the information about the remaining access points.

14 Claims, 8 Drawing Sheets

Related U.S. Application Data continuation of application No. 15/174,752, filed on Jun. 6, 2016, now Pat. No. 10,299,200, which is a continuation of application No. PCT/CN2013/088799, filed on Dec. 6, 2013.

(51) Int. Cl.

| | | |
|---|---|---|
| *H04W 84/12* | (2009.01) | |
| *H04B 17/318* | (2015.01) | |
| *H04L 5/00* | (2006.01) | |
| *H04W 24/02* | (2009.01) | |
| *H04W 72/12* | (2009.01) | |
| *H04W 74/08* | (2009.01) | |
| *H04W 88/02* | (2009.01) | |
| *H04W 88/08* | (2009.01) | |

(52) U.S. Cl.
CPC ......... *H04W 24/02* (2013.01); *H04W 40/244* (2013.01); *H04W 72/1226* (2013.01); *H04W 74/0816* (2013.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 2009/0086684 A1 | 4/2009 | Kelly et al. | |
| 2011/0142029 A1* | 6/2011 | Kasslin | H04W 92/02 370/350 |
| 2012/0155426 A1 | 6/2012 | Verma et al. | |
| 2012/0220248 A1 | 8/2012 | Kanda | |
| 2012/0233679 A1 | 9/2012 | Shedrinsky | |
| 2012/0314587 A1* | 12/2012 | Curticapean | G01S 5/0284 370/252 |
| 2013/0064236 A1 | 3/2013 | Ji et al. | |
| 2013/0156016 A1 | 6/2013 | Debnath et al. | |
| 2014/0029520 A1 | 1/2014 | Farricker | |
| 2014/0112305 A1 | 4/2014 | Dayanandan et al. | |
| 2014/0269257 A1 | 9/2014 | Mandiganal et al. | |
| 2015/0063287 A1 | 3/2015 | Mazzarese et al. | |
| 2016/0014680 A1 | 1/2016 | Jang et al. | |
| 2016/0128097 A1 | 5/2016 | Pajukoski et al. | |

FOREIGN PATENT DOCUMENTS

| | | |
|---|---|---|
| CN | 101932080 A | 12/2010 |
| CN | 102300250 A | 12/2011 |
| CN | 102625357 A | 8/2012 |
| CN | 102761938 A | 10/2012 |
| CN | 103391576 A | 11/2013 |
| EP | 2285027 A1 | 2/2011 |

OTHER PUBLICATIONS

Li, Y. et al.: "Feasibility of Coordinated Transmission for HEW," doc: IEEE 802.11-13/1157r3, Sep. 18, 2013, pp. 1-18.

Tokyo Institutue of Technology et al.: "Distributed Dynamic CoMP for LTE-Advanced," 3GPP TSG RAN WG1 Meeting #58, R1-093608, Aug. 24-28, 2009, pp. 1-20, Shenzen, China.

* cited by examiner

METHOD FOR ACCESSING ACCESS POINT BY STATION DEVICE, DEVICE, AND SYSTEM

CROSS-REFERENCE TO RELATED APPLICATIONS

This application is a continuation of U.S. patent application Ser. No. 16/386,415, filed on Apr. 17, 2019, which is a continuation of U.S. patent application Ser. No. 15/174,752, filed on Jun. 6, 2016, now U.S. Pat. No. 10,299,200. The U.S. patent application Ser. No. 15/174,752 is a continuation of International Application No. PCT/CN2013/088799, filed on Dec. 6, 2013. All of the afore-mentioned patent applications are hereby incorporated by reference in their entireties.

TECHNICAL FIELD

Embodiments relate to communications technologies, and in particular, to a method for accessing an access point by a station device, a device, and a system.

BACKGROUND

With the development of communications technologies, intelligent terminals, such as portable computers and smart phones, become more popular, and these intelligent mobile terminals basically all support a wireless local area network (WLAN) technology. Moreover, due to low costs, a WLAN network attracts increasingly more users to choose the WLAN network for data service interaction; therefore, the WLAN technology based on an IEEE 802.11 standard is widely used.

With the rapid development of the WLAN technology, Wi-Fi is increasingly widely used, wireless homes and wireless cities gradually come true, and therefore, a deployment density of access points (AP) increases rapidly. In the prior art, even if in an area having a relatively large deployment density of APs, only one AP can access, in a contention manner, a channel through carrier sense multiple access with collision avoid (CSMA/CA) each time, and as a result, spectrum resources cannot be fully used, and usage efficiency of channel resources is reduced.

SUMMARY

In view of this, embodiments provide a method for accessing an access point by a station device, a device, and a system, so as to improve usage efficiency of spectrum resources, and increase a network throughput.

According to a first aspect, an embodiment provides a method for accessing an access point by a station device. The method includes acquiring, by a station device, channel quality information of multiple access points. The method also includes determining, by the station device, a master access point from the multiple access points according to the channel quality information of the multiple access points, and accessing the master access point. The method also includes sending, by the station device, information about remaining access points in the multiple access points except the master access point to the master access point, so that the master access point determines a slave access point according to the information about the remaining access points and coordinates with the slave access point to perform data transmission with the station device.

With reference to the first aspect, in a first possible implementation manner of the first aspect, if the station device does not access the master access point successfully, the station device determines that an access point, whose channel quality is lower than channel quality of only the master access point, in the multiple access points is a new master access point and the station device accesses the new master access point.

With reference to the first aspect or the first possible implementation manner of the first aspect, in a second possible implementation manner of the first aspect, the method includes: acquiring, by a station device, channel quality information of multiple access points, determining, by the station device, the master access point from the multiple access points according to the channel quality information of the multiple access points, and accessing the master access point; and sending, by the station device, the information about the remaining access points in the multiple access points except the master access point to the master access point, so that the master access point determines the slave access point according to the information about the remaining access points and coordinates with the slave access point to perform data transmission with the station device.

With reference to the second possible implementation manner of the first aspect, in a third possible implementation manner of the first aspect, the acquiring, by a station device, channel quality information of multiple access points specifically includes: periodically scanning, by the station device, access points according to a preset scanning period $t_s$, and acquiring the channel quality information of the multiple access points.

With reference to the third possible implementation manner of the first aspect, in a fourth possible implementation manner of the first aspect, the determining, by the station device, a master access point from the multiple access points according to the channel quality information, and accessing the master access point specifically includes: after acquiring the channel quality information of the multiple access points at a time interval $t_s$, reselecting, by the station device, a new master access point from the multiple access points and accessing the new master access point; and the sending, by the station device, information about remaining access points in the multiple access points except the master access point to the master access point specifically includes: after reselecting the new master access point at a time interval $t_s$ and accessing the new master access point, sending, by the station device, information about remaining access points in the multiple access points except the new master access point to the new master access point.

With reference to the third possible implementation manner of the first aspect, in a fifth possible implementation manner of the first aspect, $t_s = j \times t_b$, where j is a positive integer, and $t_b$ is a beacon period.

With reference to the third possible implementation manner of the first aspect, in a sixth possible implementation manner of the first aspect, the acquiring, by a station device, channel quality information of multiple access points further includes: if a change value between channel quality of multiple access points that is acquired in a current scan and channel quality of multiple access points that is acquired in a previous scan is greater than or equal to a first set range, shortening the scanning period; or if channel quality change values of multiple access points, which are acquired in n consecutive scans, are less than the first set range, prolonging the scanning period, where n is an integer greater than or equal to 1.

With reference to the sixth possible implementation manner of the first aspect, in a seventh possible implementation manner of the first aspect, a prolonged scanning period is an integer multiple of the scanning period, and is not greater than a preset maximum scanning interval.

With reference to the first aspect or any one of the first possible implementation manner to the seventh possible implementation manner, in an eighth possible implementation manner of the first aspect, the information about the remaining access points includes basic service set identifiers of the remaining access points and/or channel quality information of the remaining access points.

With reference to the first aspect or any one of the first possible implementation manner to the eighth possible implementation manner, in a ninth possible implementation manner of the first aspect, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

According to a second aspect, an embodiment provides a method for accessing an access point by a station device. The method includes receiving, by a master access point, information, which is sent by a station device accessing the master access point, about remaining access points in multiple access points except the master access point, where the master access point is determined by the station device according to channel quality information of the multiple access points that is acquired by the station device. The method also includes selecting, by the master access point, a slave access point from the remaining access points according to the information about the remaining access points. The method also includes coordinating, by the master access point, with the slave access point to perform data transmission with the station device.

With reference to the second aspect, in a first possible implementation manner of the second aspect, before the coordinating, by the master access point, with the slave access point to perform data transmission with the station device, the method further includes: establishing an interface, which is for exchange of coordination information, between the master access point and the slave access point.

With reference to the second aspect or the first possible implementation manner of the second aspect, in a second possible implementation manner of the second aspect, after the selecting, by the master access point, a slave access point from the remaining access points according to the information about the remaining access points, the method further includes: updating, by the master access point, local second coordination cluster information, where the second coordination cluster information includes information about the station device and information about the slave access point; and sending, by the master access point, first coordination cluster information to the station device, where the first coordination cluster information includes information about the master access point and the information about the slave access point, so that the station device updates local first coordination cluster information according to the first coordination cluster information, and performs data transmission with the master access point and the slave access point according to updated first coordination cluster information.

With reference to the second aspect or either of the first possible implementation manner and the second possible implementation manner of the second aspect, in a third possible implementation manner, the information about the remaining access points includes basic service set identifiers of the remaining access points and/or channel quality information of the remaining access points; and when the information about the remaining access points includes the basic service set identifiers of the remaining access points, the selecting, by the master access point, a slave access point from the remaining access points according to the information about the remaining access points is specifically: selecting, by the master access point, an access point, which is in a same basic service set, as the slave access point according to the basic service set identifiers of the remaining access points.

With reference to the second aspect or either of the first possible implementation manner and the third possible implementation manner of the second aspect, in a fourth possible implementation manner, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

According to a third aspect, an embodiment provides a station device. The device includes a detector, configured to acquire channel quality information of multiple access points. The device also includes a processor, configured to determine a master access point from the multiple access points according to the channel quality information of the multiple access points, and access the master access point. The device also includes a transceiver, configured to send information about remaining access points in the multiple access points except the master access point to the master access point, so that the master access point determines a slave access point according to the information about the remaining access points and coordinates with the slave access point to perform data transmission with the station device.

With reference to the third aspect, in a first possible implementation manner of the third aspect, if the station device does not access the master access point successfully, the processor is further configured to determine that an access point, whose channel quality is lower than channel quality of only the master access point, in the multiple access points is a new master access point and the station device accesses the new master access point.

With reference to the third aspect or the first possible implementation manner of the third aspect, in a second possible implementation manner of the third aspect, after sending the information about the remaining access points in the multiple access points except the master access point to the master access point, the transceiver is further configured to receive first coordination cluster information sent by the master access point, where the first coordination cluster information includes information about the master access point and information about the slave access point; and the processor is further configured to update local first coordination cluster information according to the received first coordination cluster information, so as to perform data transmission with the master access point and the slave access point separately according to updated local first coordination cluster information.

With reference to the second possible implementation manner of the third aspect, in a third possible implementation manner of the third aspect, the detector is specifically configured to periodically scan access points according to a preset scanning period $t_s$, and acquire the channel quality information of the multiple access points.

With reference to the third possible implementation manner of the third aspect, in a fourth possible implementation manner of the third aspect, the processor is specifically configured to: after the channel quality information of the multiple access points is acquired at a time interval $t_s$, reselect a new master access point from the multiple access points and access the new master access point; and the transceiver is specifically configured to: after the new master access point is reselected at a time interval $t_s$ and the new master access point is accessed, send information about remaining access points in the multiple access points except the new master access point to the new master access point.

With reference to the third possible implementation manner of the third aspect, in a fifth possible implementation manner of the third aspect, $t_s=j\times t_b$, where j is a positive integer, and $t_b$ is a beacon period.

With reference to the third possible implementation manner of the third aspect, in a sixth possible implementation manner of the third aspect, the processor is further configured to: if a change value between channel quality of multiple access points that is acquired in a current scan and channel quality of multiple access points that is acquired in a previous scan is greater than or equal to a first set range, shorten the scanning period; or, if channel quality change values of multiple access points, which are acquired in n consecutive scans, are less than the first set range, prolong the scanning period, where n is an integer greater than or equal to 1.

With reference to the sixth possible implementation manner of the third aspect, in a seventh possible implementation manner of the third aspect, a prolonged scanning period is an integer multiple of the scanning period, and is not greater than a preset maximum scanning interval.

With reference to the third aspect or any one of the first possible implementation manner to the seventh possible implementation manner, in an eighth possible implementation manner of the third aspect, the information about the remaining access points includes basic service set identifiers of the remaining access points and/or channel quality information of the remaining access points.

With reference to the third aspect or any one of the first possible implementation manner to the eighth possible implementation manner, in a ninth possible implementation manner of the third aspect, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

According to a fourth aspect, embodiments further provide an access point. The access point includes a transceiver, configured to receive information, which is sent by a station device accessing a master access point, about remaining access points in multiple access points except the master access point, where the master access point is determined by the station device according to channel quality information of the multiple access points that is acquired by the station device. The access point also includes a processor, configured to select a slave access point from the remaining access points according to the information about the remaining access points, where the transceiver is further configured to coordinate with the slave access point to perform data transmission with the station device.

With reference to the fourth aspect, in a first possible implementation manner of the fourth aspect, before coordinating with the slave access point to perform data transmission with the station device, the transceiver is further configured to establish an interface, which is for exchange of coordination information, between the transceiver and the slave access point.

With reference to the fourth aspect or the first possible implementation manner of the fourth aspect, in a second possible implementation manner of the fourth aspect, after the transceiver selects the slave access point from the remaining access points according to the information about the remaining access points, the processor is further configured to update local second coordination cluster information, where the second coordination cluster information includes information about the station device and information about the slave access point. The transceiver is further configured to send first coordination cluster information to the station device, where the first coordination cluster information includes information about the master access point and the information about the slave access point, so that the station device updates local first coordination cluster information according to the first coordination cluster information, and performs data transmission with the master access point and the slave access point separately according to updated local first coordination cluster information.

With reference to the fourth aspect or either of the first possible implementation manner and the second possible implementation manner of the fourth aspect, in a third possible implementation manner, the information about the remaining access points includes basic service set identifiers of the remaining access points and/or channel quality information of the remaining access points. The processor is specifically configured to select an access point, which is in a same basic service set, as the slave access point according to the basic service set identifiers of the remaining access points.

With reference to the fourth aspect or either of the first possible implementation manner and the third possible implementation manner of the second aspect, in a fourth possible implementation manner, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), a data frame signal to noise ratio (Data Frame SNR), load information of an access point, and information about historical access to an access point by the station device.

According to a fifth aspect, an embodiment further provides a multi-access point coordination system, including a station device and an access point, where the access point includes a master access point and a slave access point, where the station device is configured to acquire channel quality information of multiple access points, determine the master access point from the multiple access points according to the channel quality information of the multiple access points, access the master access point, and send information about remaining access points in the multiple access points except the master access point to the master access point. The master access point is configured to receive the information about the remaining access points that is sent by the station device, and determine the slave access point according to the information about the remaining access points. The master access point and the slave access point are configured to coordinate to perform data transmission with the station device.

With reference to the fifth aspect, in a first feasible implementation manner of the fifth aspect, the system further includes: a timing server, configured to generate a global clock, and provide the global clock to the master access point and the slave access point, so that the master access point synchronizes with the slave access point.

With reference to the fifth aspect or the first feasible implementation manner, in a second feasible implementation manner of the fifth aspect, the master access point and the slave access point are further configured to exchange channel state measurement information of the station device by using an interface that is for exchange of coordination information.

With reference to the fifth aspect, the first feasible implementation manner, or the second feasible implementation manner, in a third feasible implementation manner of the fifth aspect, the master access point and the slave access point are further configured to share, by using an interface for exchange of coordinatedly transmitted data, data to be communicated with the station device.

According to the method for accessing an access point by a station device, the device, and the system that are provided in the embodiments of the present invention, a station device selects a master access point from multiple access points according to channel quality and accesses the master access point, and sends information about remaining access points to the master access point, so that the master access point selects a slave access point according to the information about the remaining access points. In this way, the master access point coordinates with the slave access point to perform data transmission with the station device, which improves usage efficiency of spectrum resources, and increases a network throughput.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
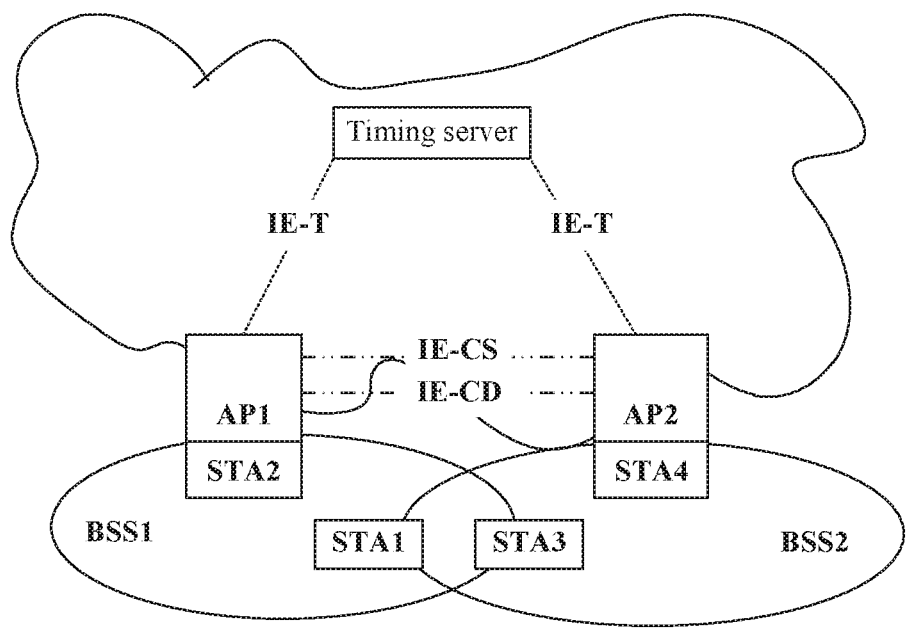
FIG. 1 is a network architectural diagram of a multi-access point coordination system according to an embodiment.

FIG. 1 is a network architectural diagram of a multi-access point coordination system according to an embodiment. Based on requirements of improving spectrum usage, reducing interference, and increasing a network throughput, this embodiment provides an architecture in which APs coordinate to perform data transmission and interference management.

The system includes: a station device and an access point, and the access point includes a master access point and a slave access point. The station device is configured to acquire channel quality information of multiple access points, determine the master access point from the multiple access points according to the channel quality information of the multiple access points, access the master access point, and send information about remaining access points in the multiple access points except the master access point to the master access point. The master access point is configured to receive the information about the remaining access points that is sent by the station device, and determine the slave access point according to the information about the remaining access points. The master access point and the slave access point are configured to coordinate to perform data transmission with the station device.

As shown in FIG. 1, an AP 1 is a master access point, and an AP 2 is a slave access point. The station devices includes a STA 1, a STA 2, a STA 3, and a STA 4, and the foregoing entities can support coordination between the APs. The AP 1 and the AP 2 may exchange scheduling information and channel state information (CSI) measurement information of a coordinating STA by using an interface for exchange of coordination information (IE-CS) interface, and may also share, by using an interface for exchange of coordinatedly transmitted data (IE-CD), data to be communicated with the coordinating STA, support network multi-input multi-output (network MIMO), and perform medium access control (MAC) service data unit (MSDU) exchange.

Further, a timing server and an interface for exchange of timing (IE-T) may be set in the system. The timing server is configured to generate a global clock, and all APs connected to the timing server may perform timing by using the interface for exchange of timing (IE-T). That is, the timing server may provide the global clock for these APs, so as to synchronize coordinating APs. The timing server may be an independent entity, or may be integrated into an AP.

Both the AP 1 and the AP 2 can keep synchronous with the timing server by using the IE-T interface; both the AP 1 and the AP 2 can negotiate and coordinate with other APs, perform coordination transmission downstream, and perform joint reception upstream.

Both the AP 1 and the AP 2 can maintain coordination cluster information, which includes list information of a coordinating AP and list information of a coordinating STA.

Both the AP 1 and the AP 2 can exchange coordination information by using the interface for exchange of coordination information (IE-CS) interface, where the coordination information includes CSI measurement information of a STA participating in coordination and scheduling information of an AP participating in coordination.

Both the AP 1 and the AP 2 can share transmit data by using the interface for exchange of coordinatedly transmitted data (IE-CD) when the AP 1 and the AP 2 perform coherent transmission.

The AP 1 and the AP 2 each can schedule a STA associated with each of the AP 1 and the AP 2, especially in an upstream process.

Persons skilled in the art should understand that the AP 1 and the AP 2 may further have all functions, which are specified in the prior art and existing standards, of an AP.

Figure 2:
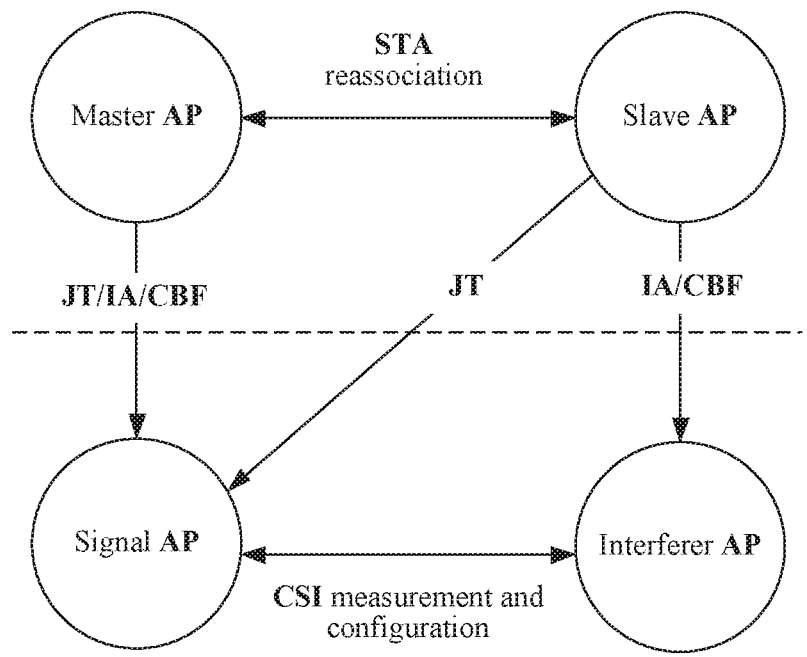
FIG. 2 is a state switching diagram of an access point in a multi-access point coordination system.

Switching of the AP 1 and the AP 2 between several states is shown in FIG. 2. According to a function and a definition of an AP entity, based on an association state between a STA and an AP, the AP may be classified into a master AP and a slave AP; based on an AP coordination transmission manner, the AP may be classified into a signal AP and an interferer AP.

An AP associated with a target STA is a master AP. The target STA exchanges control signaling with the master AP, and the master AP is responsible for scheduling the STA associated with the master AP. An AP that is not associated with the STA but is a coordinating AP is a slave AP. The slave AP participates in coordination transmission performed on the target STA. The target STA needs to measure CSI of the slave AP.

Even though the slave AP coordinates with the master AP, if the slave AP interferes with the target STA, the slave AP is also an interferer AP.

In the state switching diagram in FIG. 2, the master AP and the slave AP are distinguished and switched according to whether an AP is associated with the target STA. In all coordinating APs, an AP associated with the target STA is a master AP; an AP that is not associated with the target STA is a slave AP. State switching between the master AP and the slave AP is performed as an association state between an AP and an STA is switched.

The signal AP and the interferer AP are distinguished according to whether an AP sends data to the target STA. Switching between the signal AP and the interferer AP is performed as a coordination transmission mode and the master AP are changed.

For example, for coordinated beamforming (CBF), an interferer AP may be a signal AP in joint transmission (JT). In addition, because the master AP is switched into the slave AP, the signal AP in CBF is also changed to an interferer AP in this case. Generally, a master AP is also a signal AP. For JT, a slave AP may also be a signal AP. For CBF and interference alignment (Interference Alignment, IA), a slave AP is an interferer AP.

The STA 1, the STA 2, the STA 3, and the STA 4 each can select a candidate coordinating AP, and feed back the information to the master AP.

The STA 1, the STA 2, the STA 3, and the STA 4 each can measure and feed back CSI of the coordinating AP. Besides, the STA 1, the STA 2, the STA 3, and the STA 4 each should have all functions, which are specified in the prior art and existing standards, of a STA.

This embodiment provides methods and processes for associating with an AP by a STA and for selecting and forming an AP coordination cluster, which resolves a problem that coordination between multiple APs cannot be performed by using an existing mechanism in a WLAN. The method and system that are provided in this embodiment can support coordination and interference management of multiple APs in an OBSS scenario in a WLAN. The system provided in this embodiment can support synchronization of multiple APs in a WLAN by using an introduced timing server entity and IE-T interface. In addition, in the solutions of the present invention, a master AP is selected and associated, a slave AP is selected, a coordination cluster is formed, and a maintaining process of the master AP and the slave AP is performed, so that it is resolved that which APs are used to serve which STAs at which time, and coordination between multiple APs can be supported. In this embodiment, a forming and maintaining process of a coordination cluster of the master AP and the slave AP can effectively reduce system overheads, and it is ensured that a change of an AP in the coordination cluster is responded in time; coordination between multiple APs is supported, so that interference can be effectively suppressed, usage efficiency of spectrums can be improved, and a network throughput can be increased.

Figure 3:
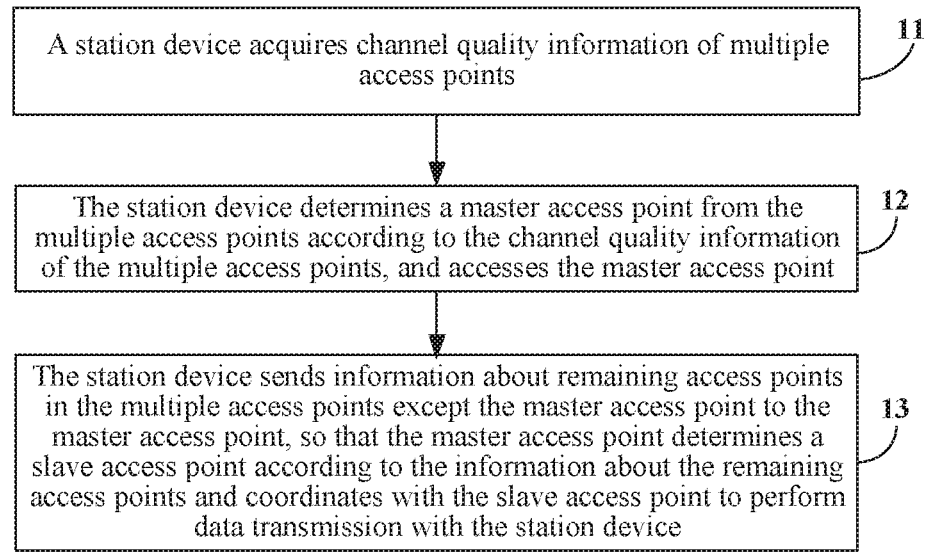
FIG. 3 is a flowchart of a method for accessing an access point by a station device according to an embodiment.

FIG. 3 is a flowchart of a method for accessing an access point by a station device according to an embodiment. The method described in this embodiment is a processing procedure on a station device side, and includes the following steps.

Step 11: A station device acquires channel quality information of multiple access points.

Step 12: The station device determines a master access point from the multiple access points according to the channel quality information of the multiple access points, and accesses the master access point.

Step 13: The station device sends information about remaining access points in the multiple access points except the master access point to the master access point, so that the master access point determines a slave access point according to the information about the remaining access points and coordinates with the slave access point to perform data transmission with the station device.

The multiple access points refer to access points whose channel quality information may be monitored by the station device. Optionally, the channel quality information may include at least one or more of the following: a received signal to noise indicator (RSNI), a received signal strength indicator (RSSI), a Beacon RSSI, a Beacon SNR, a Data Frame RSSI, and a Data Frame SNR.

Specifically, the beacon received signal strength indicator (Beacon RSSI) is signal strength of a beacon frame received on a channel, and is in units of dBm. Beacon RSSIs obtained by processing a latest received signal by different manufacturers by using different smoothing functions may be different.

The beacon signal to noise ratio (Beacon SNR) is a signal to noise ratio of a received beacon frame, and is in units of dB. Beacon signal to noise ratios obtained by processing a latest received signal by different manufacturers by using different smoothing functions may be different.

The data frame received signal strength indicator (Data Frame RSSI) is received signal strength of a data frame received from a network, and is in the unit of dBm. Data Frame RSSIs obtained by processing a latest received signal by different manufacturers by using different smoothing functions may be different.

The data frame signal to noise ratio (Data Frame SNR) is a signal to noise ratio of a received data frame, and is in the unit of dB. Data Frame SNRs obtained by processing a latest received signal by different manufacturers by using different smoothing functions may be different.

Further, the station device may further acquire load information of an AP, information about historical access to the AP by a STA, and the like. The station device may further determine the master access point or the slave access point according to the channel quality information and with reference to the load information or, for example, access information. The information about historical access to the AP by a STA refers to that, if the STA currently selects an AP 1 as the master AP, and the STA was associated with an AP 2 or an AP 2 was a master AP of the STA, the AP 2 may be preferentially selected as the slave AP to coordinate with the AP 1 to perform data transmission.

The station device may select an access point having best channel quality as the master access point and access the master access point. It should be noted that, if the station device does not access the master access point successfully, the station device may use an access point, whose channel quality is lower than channel quality of only the master access point, in the multiple access points as the master access point, and access the master access point.

The station device may send the information about the remaining access points in the multiple access points except the master access point to the master access point, so that the master access point may determine the slave access point according to the information about the remaining access points and coordinate with the slave access point to perform data transmission with the station device. The information about the remaining access points may include basic service set identifiers of the remaining access points and/or channel quality information of the remaining access points; if the information about the remaining access points includes the basic service set identifiers of the remaining access points, the master access point may select an access point, which is in a same basic service set, as the slave access point according to the basic service set identifiers of the remaining access points.

Optionally, after sending the information about the remaining access points in the multiple access points except the master access point to the master access point, the station device may further receive first coordination cluster information sent by the master access point, where the first coordination cluster information includes information about the master access point and information about the slave access point; the station device may update local first coordination cluster information according to the received first coordination cluster information, so as to perform data transmission with the master access point and the slave access point separately according to updated local first coordination cluster information.

Optionally, a process of acquiring, by the station device, the channel quality information of the multiple access points may be performed periodically, a scanning period $t_s$ may be preset, and the station device may periodically scan access points, and acquire the channel quality information of the multiple access points.

It should be noted that multiple access points that are scanned each time all refer to access points whose channel quality can be monitored by the station device. Therefore, access points involved in each scan may be exactly the same, or may be different.

It may be understood that, after acquiring the channel quality information of the multiple access points at a time interval $t_s$, the station device may reselect a new master access point from the multiple access points and access the new master access point. Further, the station device may further send information about remaining access points in the multiple access points except the new master access point to the new master access point, so that the new master access point reselects a slave access point.

Optionally, whether to adjust the scanning period may be determined according to a status of channel quality of multiple access points that are scanned each time, so that the scanning period is prolonged when the channel quality of the scanned access points changes relatively slightly, which avoids changing the master access point and the slave access point frequently; the scanning period is shortened when the channel quality of the scanned access points changes relatively greatly, so as to change the master access point and the slave access point in time.

Specifically, if a change value between channel quality of multiple access points that is acquired in a current scan and channel quality of multiple access points that is acquired in a previous scan is greater than or equal to a first set range, the scanning period is shortened; or, if channel quality change values of multiple access points, which are acquired in n consecutive scans, are less than the first set range, the scanning period is prolonged, where n is an integer greater than or equal to 1.

Optionally, a prolonged scanning period may be an integer multiple of the scanning period, and is not greater than a preset maximum scanning interval.

According to the method for accessing an access point by a station device provided in this embodiment, a station device selects a master access point from multiple access points according to channel quality and accesses the master access point, and sends information about remaining access points to the master access point, so that the master access point selects a slave access point according to the information about the remaining access points. In this way, the master access point coordinates with the slave access point to perform data transmission with the station device, which improves usage efficiency of spectrum resources, and increases a network throughput.

Figure 4:
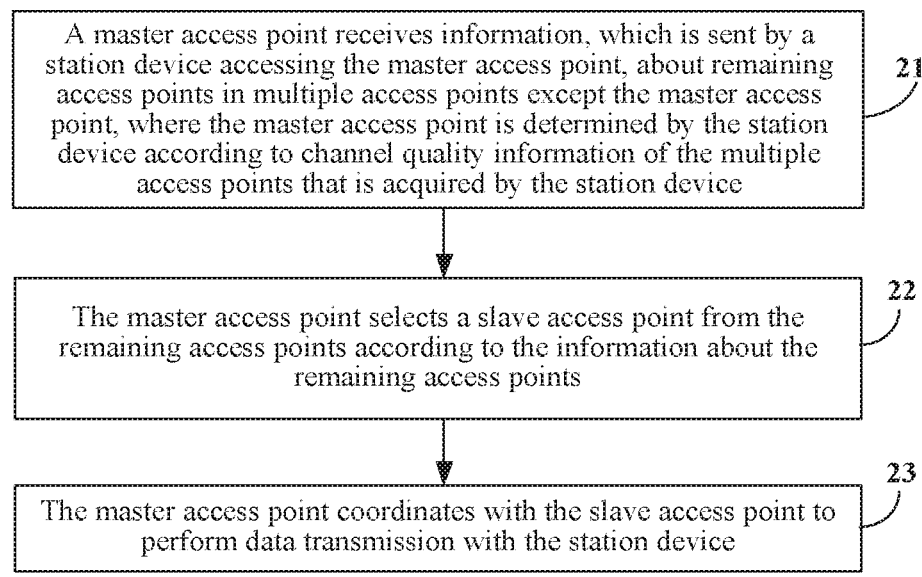
FIG. 4 is a flowchart of a method for accessing an access point by a station device according to another embodiment.

FIG. 4 is a flowchart of a method for accessing an access point by a station device according to another embodiment. The method described in this embodiment is a processing procedure on a master access point side in the embodiment shown in FIG. 4, and includes the following steps.

Step 21: A master access point receives information, which is sent by a station device accessing the master access point, about remaining access points in multiple access points except the master access point, where the master access point is determined by the station device according to channel quality information of the multiple access points that is acquired by the station device.

Step 22: The master access point selects a slave access point from the remaining access points according to the information about the remaining access points.

Step 23: The master access point coordinates with the slave access point to perform data transmission with the station device.

Optionally, before the master access point coordinates with the slave access point to perform data transmission with the station device, an interface that is for exchange of coordination information is established between the master access point and the slave access point, so that the master access point coordinates with the slave access point to perform data transmission with the station device.

Optionally, after the master access point selects the slave access point from the remaining access points according to the information about the remaining access points, the master access point may further update local second coordination cluster information, where the second coordination cluster information includes information about the station device and information about the slave access point; the master access point may also send first coordination cluster information to the station device, where the first coordination cluster information includes information about the master access point and the information about the slave access point, so that the station device updates local first coordination cluster information according to the first coordination cluster information, and performs data transmission with the master access point and the slave access point separately according to updated local first coordination cluster information.

According to the method for accessing an access point by a station device provided in this embodiment, a master access point selects a slave access point according to information about remaining access points; in this way, the master access point coordinates with the slave access point to perform data transmission with a station device, which improves usage efficiency of spectrum resources, and increases a network throughput.

Figure 5:
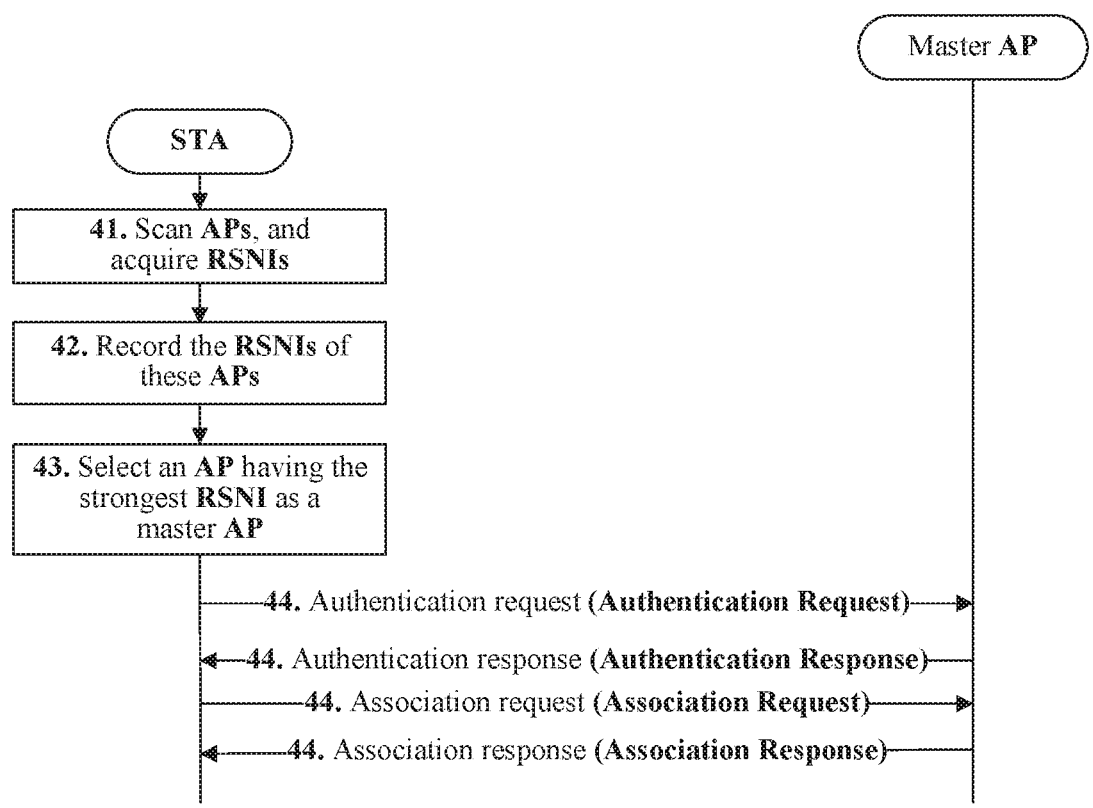
FIG. 5 is a signaling flowchart of selecting a master access point by a STA in a method for accessing an access point by a station device according to another embodiment.

FIG. 5 is a signaling flowchart of selecting a master access point by a STA in a method for accessing an access point by a station device according to another embodiment of the present invention. Specific operation steps of selecting, by a STA, a master AP associated with the STA include the following steps.

Step 41: A STA scans APs, and acquires channel quality of the multiple APs.

This embodiment and other embodiments following this embodiment are all described by using an example in which the channel quality is an RSNI.

Step 42: The STA records RSNI information of these APs, for example, the STA maintains an RSNI list for these APs, and adds all RSNIs that are obtained through measurement to the list.

Step 43: Select an AP having the strongest RSNI from the scanned APs as a master AP.

Step 44: The STA accesses the selected AP, that is, the master AP, according to a normal authentication and association process, which includes: the STA sends an authentication request to the master AP, and receives an authentication response returned by the master AP; the STA then sends an association request to the master AP, and receives an association response returned by the master AP.

If the AP having the strongest RSNI refuses to be accessed by the STA (for example, the AP and the STA are not users in a same network), the STA selects an AP having the second strongest RSNI and accesses the AP having the second strongest RSNI. This process is repeated until the STA successfully accesses an AP, which can be accessed by the STA, having a best RSNI.

Figure 6:
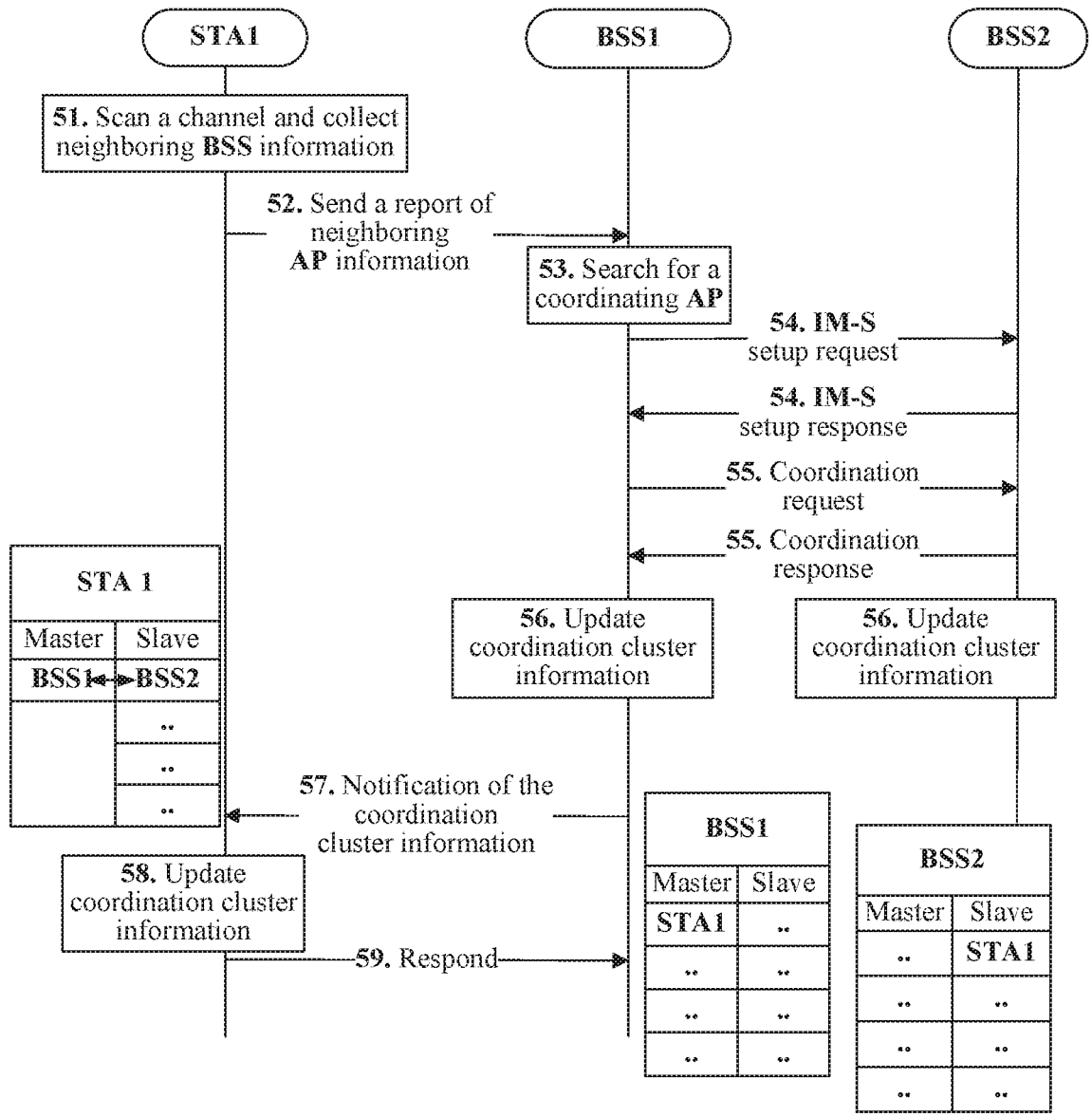
FIG. 6 is a signaling flowchart of selecting a slave access point in a method for accessing an access point by a station device according to another embodiment.

FIG. 6 is a signaling flowchart of selecting a slave access point in a method for accessing an access point by a station device according to another. Specific operation steps of selecting and associating with a slave AP and finally forming a coordination AP cluster include the following steps.

Step 51: A STA (for example, a STA 1) scans a channel, collects neighboring basic service set (BSS) information, and accesses a master AP successfully.

Step 52: The STA sends, by sending a report of neighboring AP information, received information about an AP whose RSNI value is less than an RSNI value of the master AP (for example, an AP 1) to the master AP, where the information about the AP may include a basic service set identifier (BSSID), a received signal to noise indicator (RSNI), a signal to noise ratio (SNR), and the like.

Step 53: The AP 1 searches, according to the information about the AP sent by the STA, for an AP, for example, an AP 2, with which the AP 1 can coordinate to communicate with the STA. For example, the AP 1 determines whether the AP reported by the STA 1 and the AP 1 are APs in a same network or in a same service set identifier (SSID), and uses, as a slave AP, an AP that belongs to the same network or the same BSS as the AP 1.

Step 54: The AP 1 establishes an IE-CS interface with the slave AP by using an interface for exchange of coordination information (IE-CS) setup request (IE-CS Setup Request) message and an IE-CS setup response (IE-CS Setup Response) message, where the interface may be configured to exchange CSI measurement information of the STA.

Step 55: The AP 1 establishes a coordination relationship with the slave AP by using a coordination request message/coordination response message.

Step 56: After the coordination relationship is established, each of the master AP and the slave AP upgrades respective coordination cluster information, that is, updates the coordination cluster information, for example, the AP 1 adds the STA 1 to a master STA list of the AP 1, and an AP 2 adds the STA 1 to a slave STA list.

Step 57: The master AP sends a notification of the coordination cluster information, and feeds back the coordination cluster information to the STA 1.

Step 58: The STA 1 upgrades local coordination cluster information, that is, updates the coordination cluster information, for example, adds the AP 1 to a master AP list, and adds the AP 2 to a slave AP list.

Step 59: The STA 1 sends a response (ACK) message to the master AP, to respond to the coordination cluster information sent by the master AP.

So far, the process of selecting and associating with the master AP by the STA 1 and establishing the coordination AP cluster by the master AP is completed.

Figure 7:
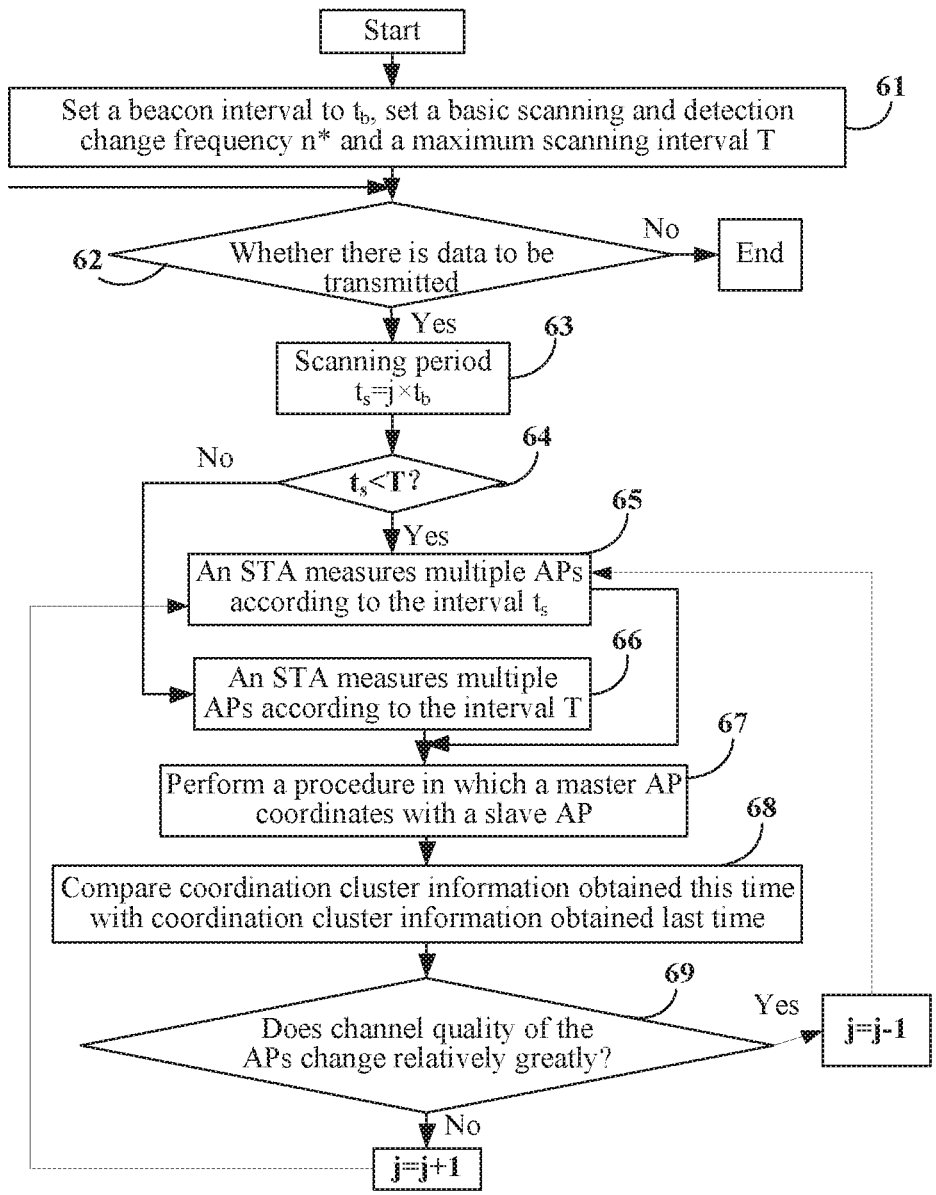
FIG. 7 is a flowchart of a method for accessing an access point by a station device according to another embodiment.

FIG. 7 is a flowchart of a method for accessing an access point by a station device according to another embodiment. This embodiment provides a detailed process of periodically scanning access points by a STA. The STA may prolong and shorten a scanning period according to a status of channel quality of multiple access points that is obtained through scanning. Specific operation steps include the following steps.

Step 61: A STA acquires beacon period information, where beacons of all APs are the same, and may be, for example, $t_b$. The STA may set a scanning interval change frequency n* and a maximum scanning interval T. In a common situation, T is an integer multiple of $t_b$.

Step 62: The STA determines whether there is data to be transmitted; if yes, perform step 63; otherwise, end the process.

Step 63: When the STA needs to transmit data, a scanning period $t_s = j \times t_b$ is first defined, where j may be a set integer.

Step 64: Determine whether $t_s$ is less than T; if yes, perform step 65; otherwise, perform step 66.

Step 65: The STA scans once at a time interval $t_s$, to obtain RSNI information of multiple APs; then perform step 67.

Step 66: The STA scans once at a time interval T, to obtain RSNI information of multiple APs; then perform step 67.

Step 67: The STA performs, according to the obtained RSNI information, processes of selecting a master AP and associating with the master AP, selecting a slave AP, and forming a coordination cluster. For details, reference may be made to corresponding descriptions in the embodiments in FIG. 3 to FIG. 6, and details are not described herein again.

Step 68: The STA compares channel quality of the multiple APs that is acquired through current scanning with channel quality of multiple access points that is acquired through previous scanning.

Step 69: If a change value between the channel quality of the multiple access points that is acquired in a current scan and the channel quality of the multiple access points that is acquired in a previous scan is greater than or equal to a first set range, set that j=j−1, so as to shorten the scanning period, and then perform step 65; when the STA has no data transmission requirement or ends current transmission, a maintaining process of the master AP and the slave AP also ends; or, if channel quality change values of multiple access points, which are acquired in n consecutive scans, are less than the first set range, set that j=j+1, so as to prolong the scanning period, and then perform step 66.

It should be noted that, when the channel quality of the APs changes relatively slightly, extra system overhead burden caused by frequently changing the master AP and the slave AP can be avoided. When the channel quality changes greatly, the master AP and the slave AP can be changed in time, so as to ensure data transmission of the STA. The first set range may be set according to actual situations or requirements, for example, it may be determined whether RSNI values of multiple APs increase or decrease by a fixed threshold; if an increased value or a decreased value exceeds the threshold, it is considered that the channel quality changes relatively greatly; otherwise, it is considered that the channel quality changes relatively slightly. In a process of determining the change, a change status of channel quality of the master AP in the multiple APs may be used as a reference, a change status of channel quality of the slave AP may also be used as a reference, or a change status of channel quality of another one or more APs may be used as a reference.

Figure 8:
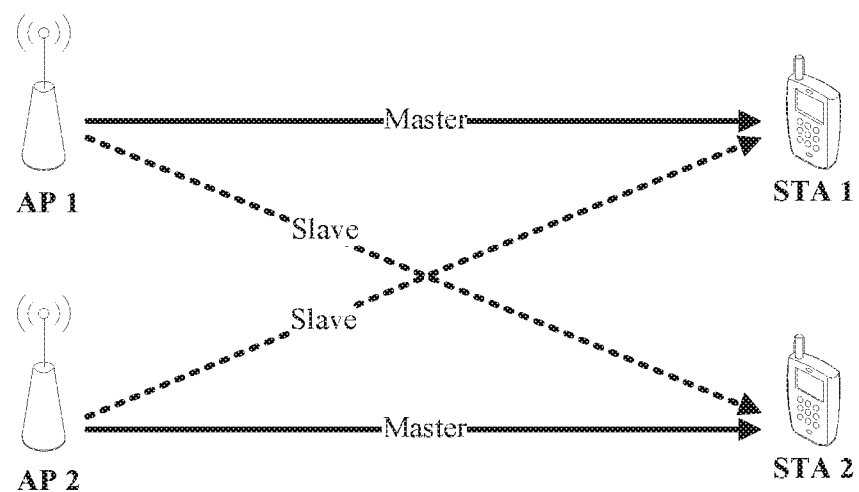
FIG. 8 is a schematic diagram of coordinating, by access points, to communicate with a STA according to another embodiment.

By using a scenario shown in FIG. 8 as an example, an AP 1 and an AP 2 are respectively a master AP and a slave AP of a STA 1, and are respectively a slave AP and a master AP of a STA 2.

Figure 9:
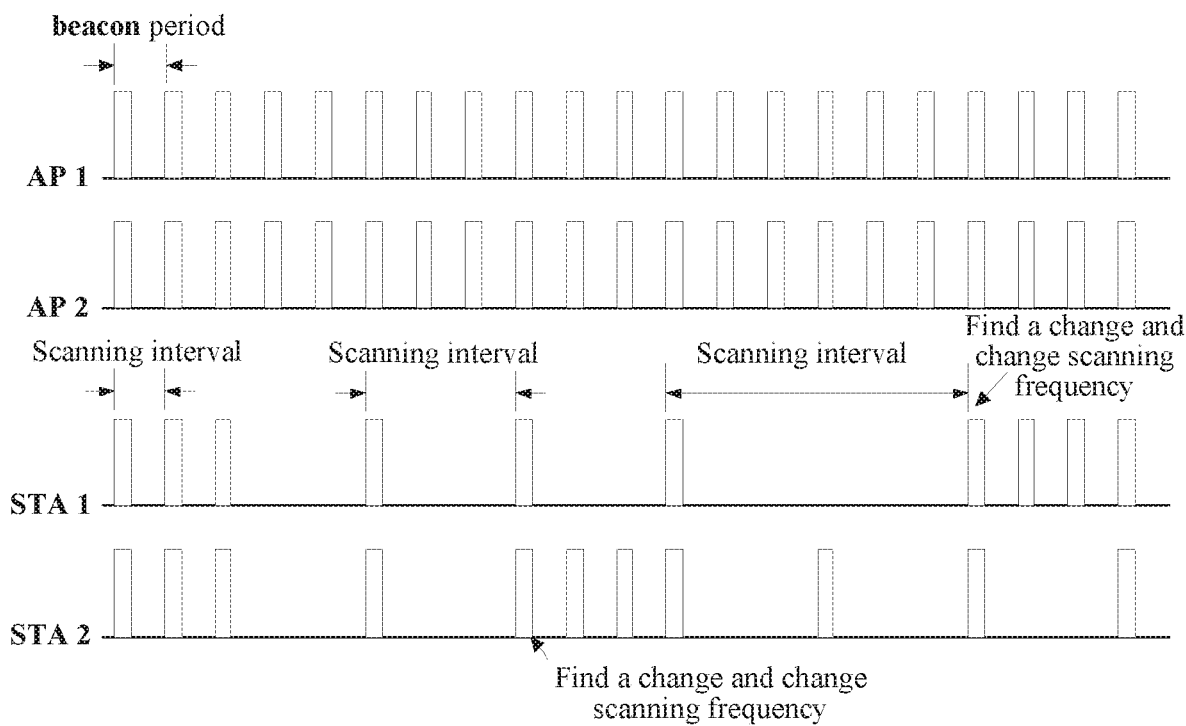
FIG. 9 is a schematic diagram of a scanning interval of a STA in a method for accessing an access point by a station device according to an embodiment.

As shown in FIG. 9, the AP 1 and the AP 2 send beacons with a fixed period. At an initial stage, the STA 1 and the STA 2 perform scanning at an interval of a beacon period, and after it is found by performing scanning for three continuous times that channel quality of the APs does not change greatly, the scanning interval becomes three times the length of the beacon period. After it is found after scanning is performed for three continuous times at the new scanning interval that the channel quality of the APs still does not change greatly, the scanning interval is updated to three times the length of the current scanning interval time, such as the STA 1 in FIG. 9. If the channel quality of the APs does not change in a relatively long time, after the scanning interval reaches a maximum value, the maximum value of the scanning interval remains unchanged until the channel quality of the APs changes relatively greatly, so as to avoid that the STA cannot respond to a change of the channel quality of the APs in time due to limitless prolonging of the scanning interval. When the channel quality of the APs changes relatively greatly, the STA resets the scanning interval to the beacon period, and performs the maintaining process of the master AP and the slave AP again according to the foregoing steps, for example, the seventh scanning interval of the STA 1 and the fifth scanning interval of the STA 2 in FIG. 9.

Figure 10:
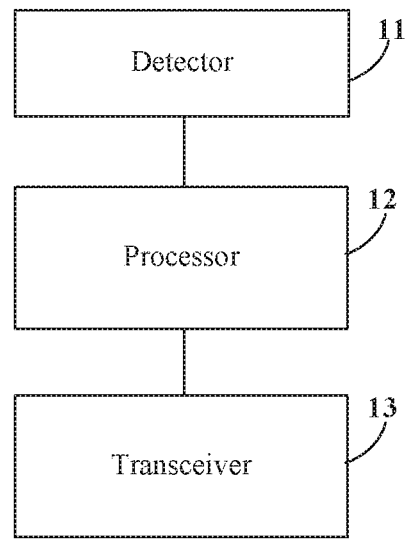
FIG. 10 is a schematic structural diagram of a station device according to an embodiment.

FIG. 10 is a schematic structural diagram of a station device according to an embodiment. The device described in this embodiment is configured to implement the method shown in FIG. 3, and includes: a detector 11, configured to acquire channel quality information of multiple access points. The device also includes a processor 12, configured to determine a master access point from the multiple access points according to the channel quality information of the multiple access points, and access the master access point. The device also includes a transceiver 13, configured to send information about remaining access points in the multiple access points except the master access point to the master access point, so that the master access point determines a slave access point according to the information about the remaining access points and coordinates with the slave access point to perform data transmission with the station device.

Optionally, if the station device does not access the master access point successfully, the processor 12 is further configured to determine that an access point, whose channel quality is lower than channel quality of only the master access point, in the multiple access points is a new master access point and access the new master access point.

Optionally, after sending the information about the remaining access points in the multiple access points except the master access point to the master access point, the transceiver 11 is further configured to receive first coordination cluster information sent by the master access point, where the first coordination cluster information includes information about the master access point and information about the slave access point. The processor 12 is further configured to update local first coordination cluster information according to the received first coordination cluster information, so as to perform data transmission with the master access point and the slave access point separately according to updated local first coordination cluster information.

Optionally, the detector 11 is specifically configured to periodically scan access points according to a preset scanning period $t_s$, and acquire the channel quality information of the multiple access points.

Optionally, the processor 12 is specifically configured to: after the channel quality information of the multiple access points is acquired at a time interval $t_s$, reselect a new master access point from the multiple access points and access the new master access point. The transceiver 13 is specifically configured to: after the new master access point is reselected at a time interval $t_s$ and the new master access point is accessed, send information about remaining access points in the multiple access points except the new master access point to the new master access point.

Optionally, j is a positive integer, and $t_b$ is a beacon period.

Optionally, the processor 12 is further configured to: if a change value between channel quality of multiple access points that is acquired in a current scan and channel quality of multiple access points that is acquired in a previous scan is greater than or equal to a first set range, shorten the scanning period; or, if channel quality change values of multiple access points, which are acquired in n consecutive scans, are less than the first set range, prolong the scanning period, where n is an integer greater than or equal to 1.

Optionally, a prolonged scanning period is an integer multiple of the scanning period, and is not greater than a preset maximum scanning interval.

Optionally, the information about the remaining access points may include basic service set identifiers of the remaining access points and/or channel quality information of the remaining access points.

Optionally, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

For a specific execution process of the station device provided in this embodiment and technical effects thereof, reference may be made to related descriptions in the embodiments in FIG. 3 and FIG. 5 to FIG. 9, and details are not described herein again.

Figure 11:
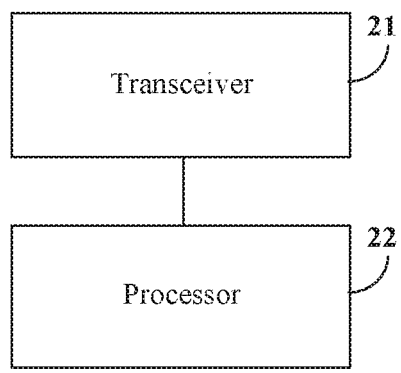
FIG. 11 is a schematic structural diagram of an embodiment of an access point.

FIG. 11 is a schematic structural diagram of an embodiment of an access point. As shown in FIG. 11, the access point includes a transceiver 21, configured to receive information, which is sent by a station device accessing a master access point, about remaining access points in multiple access points except the master access point, where the master access point is determined by the station device according to channel quality information of the multiple access points that is acquired by the station device. The access point also includes a processor 22, configured to select a slave access point from the remaining access points according to the information about the remaining access points, where the transceiver 21 is further configured to coordinate with the slave access point to perform data transmission with the station device.

Optionally, before coordinating with the slave access point to perform data transmission with the station device, the transceiver 21 is further configured to establish an interface, which is for exchange of coordination information, between the transceiver 21 and the slave access point.

Optionally, after the transceiver 21 selects the slave access point from the remaining access points according to the information about the remaining access points, the processor 22 is further configured to update local second coordination cluster information, where the second coordination cluster information includes information about the station device and information about the slave access point; and the transceiver 21 is further configured to send first coordination cluster information to the station device, where the first coordination cluster information includes information about the master access point and the information about the slave access point, so that the station device updates local first coordination cluster information according to the first coordination cluster information, and performs data transmission with the master access point and the slave access point separately according to updated local first coordination cluster information.

Optionally, the information about the remaining access points may include basic service set identifiers of the remaining access points and/or channel quality information of the remaining access points; and the processor 22 may be specifically configured to select an access point, which is in a same basic service set, as the slave access point according to the basic service set identifiers of the remaining access points.

Optionally, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

The access point provided in this embodiment is configured to perform the methods involved in the embodiments shown in FIG. 4 to FIG. 9. For a specific execution process of the access point and technical effects thereof, reference may be made to related descriptions in the method embodiments, and details are not described herein again.

Figure 12:
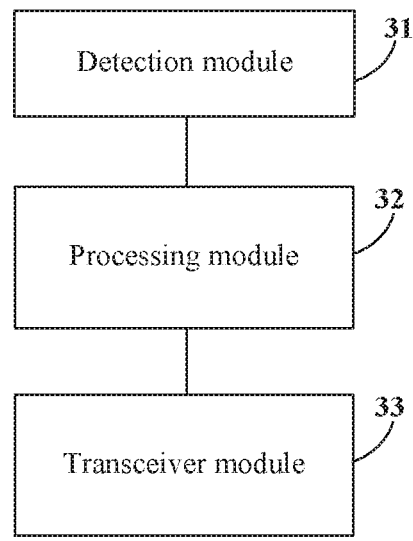
FIG. 12 is a schematic structural diagram of a station device according to another embodiment.

FIG. 12 is a schematic structural diagram of a station device according to another embodiment of the present invention. The device described in this embodiment is configured to implement the method shown in FIG. 3, and includes: a detection module 31, configured to acquire channel quality information of multiple access points; a processing module 32, configured to determine a master access point from the multiple access points according to the channel quality information of the multiple access points, and access the master access point; and a transceiver module 33, configured to send information about remaining access points in the multiple access points except the master access point to the master access point, so that the master access point determines a slave access point according to the information about the remaining access points and coordinates with the slave access point to perform data transmission with the station device.

Optionally, if the station device does not access the master access point successfully, the processing module 32 is further configured to determine that an access point, whose channel quality is lower than channel quality of only the master access point, in the multiple access points is a new master access point and access the new master access point.

Optionally, after sending the information about the remaining access points in the multiple access points except the master access point to the master access point, the transceiver module 33 is further configured to receive first coordination cluster information sent by the master access point, where the first coordination cluster information includes information about the master access point and information about the slave access point; and the processing module 32 is further configured to update local first coordination cluster information according to the received first coordination cluster information, so as to perform data transmission with the master access point and the slave access point separately according to updated local first coordination cluster information.

Optionally, the detection module 31 is specifically configured to periodically scan access points according to a preset scanning period $t_s$, and acquire the channel quality information of the multiple access points.

Optionally, the processing module 32 is specifically configured to: after the channel quality information of the multiple access points is acquired at a time interval $t_s$, reselect a new master access point from the multiple access points and access the new master access point; and the transceiver module 33 is specifically configured to: after the new master access point is reselected at a time interval $t_s$ and the new master access point is accessed, send information about remaining access points in the multiple access points except the new master access point to the new master access point.

Optionally, j is a positive integer, and $t_b$ is a beacon period.

Optionally, the processing module 32 is further configured to: if a change value between channel quality of multiple access points that is acquired in a current scan and channel quality of multiple access points that is acquired in a previous scan is greater than or equal to a first set range, shorten the scanning period; or, if channel quality change values of multiple access points, which are acquired in n consecutive scans, are less than the first set range, prolong the scanning period, where n is an integer greater than or equal to 1.

Optionally, a prolonged scanning period is an integer multiple of the scanning period, and is not greater than a preset maximum scanning interval.

Optionally, the information about the remaining access points may include basic service set identifiers of the remaining access points and/or channel quality information of the remaining access points.

Optionally, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

For a specific execution process of the station device provided in this embodiment and technical effects thereof, reference may be made to related descriptions in the method embodiments in FIG. 3 and FIG. 5 to FIG. 9, and details are not described herein again.

Figure 13:
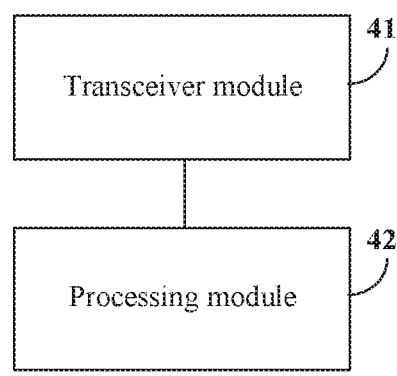
FIG. 13 is a schematic structural diagram of an embodiment of an access point.

FIG. 13 is a schematic structural diagram of an embodiment of an access point. As shown in FIG. 13, the access point includes: a transceiver module 41, configured to receive information, which is sent by a station device accessing a master access point, about remaining access points in multiple access points except the master access point, where the master access point is determined by the station device according to channel quality information of the multiple access points that is acquired by the station device; and a processing module 42, configured to select a slave access point from the remaining access points according to the information about the remaining access points, where the transceiver module 41 is further configured to coordinate with the slave access point to perform data transmission with the station device.

Optionally, before coordinating with the slave access point to perform data transmission with the station device, the transceiver module 41 is further configured to establish an interface, which is for exchange of coordination information, between the transceiver module 41 and the slave access point.

Optionally, after the transceiver 21 selects the slave access point from the remaining access points according to the information about the remaining access points, the transceiver module 41 is further configured to update local second coordination cluster information, where the second coordination cluster information includes information about the station device and information about the slave access point; and the transceiver module 41 is further configured to send first coordination cluster information to the station device, where the first coordination cluster information includes information about the master access point and the information about the slave access point, so that the station device updates local first coordination cluster information according to the first coordination cluster information, and performs data transmission with the master access point and the slave access point separately according to updated local first coordination cluster information.

Optionally, the information about the remaining access points may include basic service set identifiers of the remaining access points and/or channel quality information of the remaining access points; and the transceiver module 41 may be specifically configured to select an access point, which is in a same basic service set, as the slave access point according to the basic service set identifiers of the remaining access points.

Optionally, the channel quality information includes at least one or more of the following: a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), and a data frame signal to noise ratio (Data Frame SNR).

The station device provided in this embodiment is configured to perform the methods involved in the embodiments shown in FIG. 4 to FIG. 9. For a specific execution process of the station device and technical effects thereof, reference may be made to related descriptions in the method embodiments, and details are not described herein again.

With descriptions of the foregoing embodiments, persons skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the embodiments includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A station, comprising:
a processor; and
a non-transitory computer-readable storage medium storing a program to be executed by the processor, the program including instructions for:
receiving first coordination cluster information, wherein the first coordination cluster information includes access information of a master access point and access information of slave access point; and
performing data transmission with the master access point and the slave access point according to the first coordination cluster information;
acquiring access information of multiple access points, wherein the access information comprises channel quality information, and wherein acquiring the access information of multiple access points comprises periodically scanning the multiple access points according to a preset scanning period $t_s$;
determining the master access point from the multiple access points according to the access information of the multiple access points, wherein the determining a master access point from the multiple access points according to the access information comprises reselecting, after acquiring the channel quality information of the multiple access points at a first time interval, a master access point from the multiple access points according to the channel quality information; and
accessing the master access point, wherein accessing the master access point comprises accessing the reselected master access point; and
sending access information of the remaining access points in the multiple access points except the master access point, wherein sending the access information of the remaining access points comprises sending, after reselecting the master access point at a second time interval and accessing the master access point, access information of remaining access point in the multiple access points, except the master access point, to the master access point.

2. The station according to claim 1, wherein the access information further comprises at least one of basic service set identifiers or load information.

3. The station according to claim 2, wherein acquiring the access information of multiple access points further comprises:
acquiring the channel quality information of the multiple access points.

4. The station according to claim 3, wherein the instructions for acquiring channel quality information of multiple access points includes instructions for performing one of the following:
shortening, based on a determination that a change value between channel quality of multiple access points that are acquired in a current scan and channel quality of multiple access points that are acquired in a previous scan is greater than or equal to a first set range, the scanning period; or
prolonging, based on a determination that the channel quality change values of multiple access points acquired in n consecutive scans, are less than the first set range, the scanning period, wherein n is an integer greater than or equal to 2.

5. The station according to claim 4, wherein a prolonged scanning period is an integer multiple of the scanning period, and is not greater than a preset maximum scanning interval.

6. The station according to claim 1, wherein the channel quality information comprises at least one a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), or a data frame signal to noise ratio (Data Frame SNR).

7. The station according to claim 1, wherein $t_s=j \times t_b$, wherein j is a positive integer, and $t_b$ is a beacon period.

8. A non-transitory computer-readable storage medium storing a program to be executed by a processor, the program including instructions for:
receiving first coordination cluster information, wherein the first coordination cluster information includes access information of a master access point and access information of slave access point; and
performing data transmission with the master access point and the slave access point according to the first coordination cluster information;
acquiring access information of multiple access points, wherein the access information comprises channel quality information, and wherein acquiring the access information of multiple access points comprises periodically scanning the multiple access points according to a preset scanning period $t_s$;
determining the master access point from the multiple access points according to the access information of the multiple access points, wherein the determining a master access point from the multiple access points according to the access information comprises reselecting, after acquiring the channel quality information of the multiple access points at a first time interval, a master access point from the multiple access points according to the channel quality information; and
accessing the master access point, wherein accessing the master access point comprises accessing the reselected master access point; and
sending access information of the remaining access points in the multiple access points except the master access point, wherein sending the access information of the remaining access points comprises sending, after reselecting the master access point at a second time interval and accessing the master access point, access information of remaining access point in the multiple access points, except the master access point, to the master access point.

9. The program according to claim 8, wherein the access information further comprises at least one of basic service set identifiers or load information.

10. The program according to claim 9, wherein acquiring channel quality information of multiple access points further comprises:
acquiring the channel quality information of the multiple access points.

11. The program according to claim 10, wherein the instructions for acquiring channel quality information of multiple access points includes instructions for performing one of the following:
shortening, based on a determination that a change value between channel quality of multiple access points that are acquired in a current scan and channel quality of multiple access points that are acquired in a previous scan is greater than or equal to a first set range, the scanning period; or prolonging, based on a determination that the channel quality change values of multiple access points acquired in n consecutive scans, are less than the first set range, the scanning period, wherein n is an integer greater than or equal to 2.

12. The program according to claim 11, wherein a prolonged scanning period is an integer multiple of the scanning period, and is not greater than a preset maximum scanning interval.

13. The program according to claim 8, wherein the channel quality information comprises at least one of a received signal to noise indicator (RSNI), a received signal strength indicator (RSSI), a beacon received signal strength indicator (Beacon RSSI), a beacon signal to noise ratio (Beacon SNR), a data frame received signal strength indicator (Data Frame RSSI), or a data frame signal to noise ratio (Data Frame SNR).

14. The program according to claim 8, wherein $t_s = j \times t_b$, wherein j is a positive integer, and $t_b$ is a beacon period.

* * * * *